(12) United States Patent
Chan et al.

(10) Patent No.: US 11,995,562 B2
(45) Date of Patent: May 28, 2024

(54) INTEGRATING DOCUMENTATION KNOWLEDGE WITH LOG MINING FOR SYSTEM DIAGNOSIS

(71) Applicant: International Business Machines Corporation, Armonk, NY (US)

(72) Inventors: Yuk L. Chan, Rochester, NY (US); Lei Yu, Sleepy Hollow, NY (US); Jia Qi Li, Beijing (CN); Zhi Shuai Han, Beijing (CN); Tian Wu, Beijing (CN); Hong Min, Hopewell Junction (CN); Fan Jing Meng, Haidian District (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 846 days.

(21) Appl. No.: 17/110,430

(22) Filed: Dec. 3, 2020

(65) Prior Publication Data

US 2022/0180217 A1  Jun. 9, 2022

(51) Int. Cl.
*G06N 5/022* (2023.01)
*G06F 11/07* (2006.01)
(Continued)

(52) U.S. Cl.
CPC ........... *G06N 5/022* (2013.01); *G06F 11/079* (2013.01); *G06F 16/9024* (2019.01); *G06F 40/30* (2020.01)

(58) Field of Classification Search
CPC ..... G06N 5/022; G06F 16/9024; G06F 40/30; G06F 11/079
See application file for complete search history.

(56) References Cited

U.S. PATENT DOCUMENTS 6,349,290 B1   2/2002  Horowitz et al.
7,506,195 B2   3/2009  Takahashi et al.
(Continued)

FOREIGN PATENT DOCUMENTS

CN    101325520 B   8/2010
CN    103761173 A   4/2014
(Continued)

OTHER PUBLICATIONS

1 Metric Pair Log Frequency Correlation—Google Scholar/Patents search—text refined (year: 2022).
(Continued)

*Primary Examiner* — David E Choi
(74) *Attorney, Agent, or Firm* — CANTOR COLBURN LLP; Teddi Maranzano

(57) ABSTRACT

Aspects of the invention include computer systems, computer-implemented methods, and computer program products configured to integrate documentation knowledge with log mining data. A non-limiting example computer-implemented method includes determining a message-message relationship based on log message documentation and building a first subgraph based on the message-message relationship. The method further includes receiving a first message log entry having a message identifier and message field data. A second message log entry is correlated with the first message log entry based on at least one of the message identifier and the message field data. A second subgraph is built that includes the first message log entry and the second message log entry. The method includes building a graph that includes the first subgraph and the second subgraph.

20 Claims, 10 Drawing Sheets

(51) Int. Cl.
*G06F 16/901* (2019.01)
*G06F 40/30* (2020.01)

(56) References Cited

U.S. PATENT DOCUMENTS

| | | |
|---|---|---|
| 7,742,875 B2 | 6/2010 | Li et al. |
| 7,856,575 B2 | 12/2010 | Bock et al. |
| 7,860,815 B1 | 12/2010 | Tangirala |
| 8,065,336 B2 | 11/2011 | Armstrong et al. |
| 8,229,953 B2 | 7/2012 | Kapuram et al. |
| 8,495,429 B2 | 7/2013 | Fu et al. |
| 9,086,944 B2 | 7/2015 | Lentile et al. |
| 9,164,983 B2 | 10/2015 | Liu et al. |
| 9,215,164 B2 | 12/2015 | Scharf et al. |
| 9,225,730 B1 | 12/2015 | Brezinski |
| 9,244,755 B2 | 1/2016 | Huang et al. |
| 9,298,453 B2 | 3/2016 | Vangala et al. |
| 9,354,961 B2 | 5/2016 | Nagura et al. |
| 9,367,809 B2 | 6/2016 | Puri et al. |
| 9,413,837 B2 | 8/2016 | Vaccari et al. |
| 9,633,106 B1 | 4/2017 | Saurabh et al. |
| 9,710,322 B2 | 7/2017 | Jewell et al. |
| 9,734,005 B2 | 8/2017 | Ruan et al. |
| 9,772,898 B2 | 9/2017 | Deshpande et al. |
| 9,811,795 B1 | 11/2017 | Kearns et al. |
| 9,891,983 B1 | 2/2018 | Dechiaro |
| 9,984,060 B2 | 5/2018 | Bhattacharya et al. |
| 9,984,148 B2 | 5/2018 | Lee et al. |
| 10,042,613 B2 | 8/2018 | Castielli et al. |
| 10,042,697 B2 | 8/2018 | Ahad |
| 10,083,073 B2 | 9/2018 | Ambichl et al. |
| 10,120,747 B2 | 11/2018 | Cunico et al. |
| 10,133,568 B2 | 11/2018 | He et al. |
| 10,140,287 B2 | 11/2018 | Dasgupta et al. |
| 10,140,576 B2 | 11/2018 | Eldardiry et al. |
| 10,142,357 B1 | 11/2018 | Tamersoy et al. |
| 10,162,696 B2 | 12/2018 | Kogan-Katz et al. |
| 10,169,731 B2 | 1/2019 | Brew et al. |
| 10,193,533 B2 | 1/2019 | Chen et al. |
| 10,270,668 B1 | 4/2019 | Thompson et al. |
| 10,303,533 B1 | 5/2019 | Panov et al. |
| 10,318,541 B2 | 6/2019 | Bingham et al. |
| 10,339,457 B2 | 7/2019 | Ryckbosch et al. |
| 10,346,229 B2 | 7/2019 | Tee et al. |
| 10,346,758 B2 | 7/2019 | Natsumeda |
| 10,402,255 B1 | 9/2019 | Niyogi |
| 10,467,318 B2 | 11/2019 | Truitt et al. |
| 10,523,520 B2 | 12/2019 | Aggarwal et al. |
| 10,552,289 B2 | 2/2020 | Ilangovan et al. |
| 10,585,774 B2 | 3/2020 | Chen et al. |
| 10,616,038 B2 | 4/2020 | Kushmerick et al. |
| 10,628,747 B2 | 4/2020 | Chen et al. |
| 10,637,745 B2 | 4/2020 | Naous |
| 10,664,535 B1 | 5/2020 | Hahn |
| 10,673,721 B2 | 6/2020 | Hashimoto et al. |
| 10,701,096 B1 | 6/2020 | Johnston et al. |
| 10,878,184 B1* | 12/2020 | Estes .................. G06F 40/30 |
| 11,347,622 B1 | 5/2022 | Agarwal et al. |
| 2004/0249821 A1 | 12/2004 | Nies et al. |
| 2010/0011053 A1 | 1/2010 | Bhogal et al. |
| 2011/0087924 A1 | 4/2011 | Kandula et al. |
| 2011/0083123 A1 | 5/2011 | Lou et al. |
| 2013/0124923 A1 | 5/2013 | Wang et al. |
| 2014/0365575 A1 | 12/2014 | Spaven et al. |
| 2016/0124823 A1 | 5/2016 | Ruan et al. |
| 2016/0253229 A1 | 9/2016 | Sade et al. |
| 2016/0307285 A1 | 10/2016 | Gallagher |
| 2017/0013003 A1 | 1/2017 | Samuni et al. |
| 2017/0187586 A1* | 6/2017 | Droux .................. H04L 43/06 |
| 2017/0228460 A1 | 8/2017 | Amel et al. |
| 2018/0041500 A1 | 2/2018 | Menahem et al. |
| 2018/0144041 A1 | 5/2018 | Chen et al. |
| 2018/0173727 A1* | 6/2018 | Kreutzer ............. G06F 12/0893 |
| 2018/0211197 A1 | 7/2018 | Vosseler et al. |
| 2018/0219723 A1 | 8/2018 | Scarpelli et al. |
| 2018/0308001 A1 | 10/2018 | Doddala et al. |
| 2018/0359530 A1 | 12/2018 | Marlow et al. |
| 2019/0073257 A1 | 3/2019 | Dasgupta et al. |
| 2019/0114244 A1 | 4/2019 | Salunke et al. |
| 2019/0188286 A1 | 6/2019 | Chan et al. |
| 2019/0250970 A1 | 8/2019 | Gupta et al. |
| 2019/0356533 A1 | 11/2019 | Vasseur et al. |
| 2019/0391863 A1 | 12/2019 | Ofer et al. |
| 2020/0076841 A1 | 3/2020 | Hajimirsadeghi et al. |
| 2020/0084085 A1 | 3/2020 | Tucker et al. |
| 2020/0104775 A1 | 4/2020 | Chintalapati et al. |
| 2020/0117668 A1 | 4/2020 | Chamarajnagar |
| 2020/0142954 A1 | 5/2020 | Mandalia et al. |
| 2020/0145283 A1* | 5/2020 | Zeng .................. H04L 41/40 |
| 2020/0167350 A1 | 5/2020 | Miller et al. |
| 2020/0201701 A1 | 6/2020 | Wang et al. |
| 2020/0226362 A1 | 7/2020 | Hu et al. |
| 2020/0293712 A1* | 9/2020 | Potts .................. G06F 40/169 |
| 2020/0380408 A1 | 12/2020 | Sridhar et al. |
| 2021/0064500 A1 | 3/2021 | Przestrzelski |
| 2021/0306361 A1 | 9/2021 | Tanaka et al. |
| 2021/0342313 A1 | 11/2021 | Riddell |
| 2021/0382770 A1 | 12/2021 | Lu et al. |
| 2022/0269554 A1 | 8/2022 | Saxena et al. |
| 2022/0377134 A1* | 11/2022 | Gustafsson ............. G06F 9/546 |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| CN | 113434357 A | 9/2021 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | 2020023787 A1 | 7/2019 |

OTHER PUBLICATIONS

Chen et al.; "Correlated Anomaly Detection From Large Streaming Data", BigData IEEE International Conference On, pp. 1-11, Dec. 10-13, 2018.

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion For Anomaly Detection: Using across-domain and across-time peer-group consistency checks", JoWUA Journal Of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference On, pp. 1-11, Nov. 2-5, 2016.

Gao et al.; "Modeling Probabilistic Measurement Correlations For . . . Distributed Systems", ICDCS IEEE 29th International Conference On, pp. 623-630, Jun. 22-26, 2009.

Leman Akoglu et al, "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 7, 2021; 2 pages.

Madireddy et al.; "Analysis And Correlation Of Application I/O Performance And System-Wide I/O Activity", Argonne National Laboratory, pp. 1-12, Apr. 2017.

Peiris et al.; "PAD: Performance Anomaly Detection In Multi-Server Distributed Systems", Cloud IEEE 7th International Conference On, pp. 769-776, Jun. 27-Jul. 2, 2014.

Peng et al.; "CM-GANs: Cross-Modal Generative Adversarial Networks For Common Representation Learning", Cornell University Library, arXiv:1710.05106v2,pp. 1-13,Apr. 26, 2018.

Song, Lei; "Informative Correlation Extraction From And For Forex Market Analysis", Auckland University Of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

(56) References Cited

OTHER PUBLICATIONS

U.S. Appl. No. 17/110,438, filed Dec. 3, 2020, Entitled: Correlation-Based Multi-Source Problem Diagnosis, First Named Inventor: Yuk L. Chan.
Yuk L. Chan et al., "Graph-Based Log Sequence Anomaly Detection and Problem Diagnosis," U.S. Appl. No. 17/110,535, filed Dec. 3, 2020.
Yuk L. Chan et al., "Log-Based Status Modeling and Problem Diagnosis for Distributed Applications," U.S. Appl. No. 17/110,513, filed Dec. 3, 2020.
Yuk L. Chan et al., "Message Correlation Extration for Mainframe Operation," U.S. Appl. No. 17/110,431, filed Dec. 3, 2020.
Yuk L. Chan et al., "Message-Based Event Grouping for a Computing Operation ," U.S. Appl. No. 17/110,460, filed Dec. 3, 2020.
Yuk L. Chan et al., "Message-Based Problem Diagnosis and Root Cause Analysis," U.S. Appl. No. 17/110,458, filed Dec. 3, 2020.
Zhong et al.; "An Improved Correlation-Based Anomaly Detection Approach For Condition Monitoring Data Of Industrial Equipment", ICPHM IEEE Inter. Conf. On, pp. 1-6, Jun. 20-22, 2016.

\* cited by examiner

EYUTS0003I  Topology event for *sysname* Complete - APPLID (*applid*) CICSplex (*plexname*)

Explanation

Topology Services has completed a communications endpoint event for the specified CICS® system, where:
event Identifies the event as one of the following:
 Connect A physical connection between the MAS (CICS system) and its maintenance point CMAS.
 Join A logical connection between the MAS (CICS system) and another CMAS.
 Disconnect A disconnection of the MAS (CICS system) from its maintenance point CMAS.
sysname Identifies the MAS name for the CICS system.
applid Identifies the APPLID of the CICS system.
plexname Identifies the CICSplex the CICS system is being processed for.

System action Processing continues.

User response None.

Module EYU0TSSC, EYU0TSSE, EYU0TSSJ

Destination
Console, job log, EYULOG

INTEGRATING DOCUMENTATION KNOWLEDGE WITH LOG MINING FOR SYSTEM DIAGNOSIS

BACKGROUND

The present invention generally relates to computer systems, and more specifically, to computer systems, computer-implemented methods, and computer program products for log knowledge management that integrate documentation knowledge with log mining for system diagnosis.

Complex computing systems such as mainframes are high-performance computer systems that can include a hierarchy of units such as a number of different computer nodes, servers, switches, and storage systems. An organization will typically use a mainframe to host commercial databases, transaction servers, and applications that require a greater level of processing power and security than found on a standard computing device. System administrators can determine a mainframe computing system's performance by monitoring log messages written by applications running on the mainframe's components.

System log messages offer essential insights into how to manage complex computing environments. These messages can be used to monitor system activities, keep the system correctly running, and to diagnose system problems. Different types of logs can be generated during system operation to record various events. Messages can be issued to the system operator at the system console of each subsystem. To ease review and debugging, these messages can be supplemented with explanations and user responses to provide context for the various situations that are associated with each message.

SUMMARY

Embodiments of the present invention are directed to the integration of documentation knowledge with log mining data. A non-limiting example computer-implemented method includes determining a message-message relationship based on log message documentation and building a first subgraph based on the message-message relationship. The method further includes receiving a first message log entry having a message identifier and message field data. A second message log entry is correlated with the first message log entry based on at least one of the message identifier and the message field data. A second subgraph is built that includes the first message log entry and the second message log entry. The method includes building a graph that includes the first subgraph and the second subgraph.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 illustrates a log message in accordance with one or more embodiments of the present invention;

DETAILED DESCRIPTION

Figure 1:
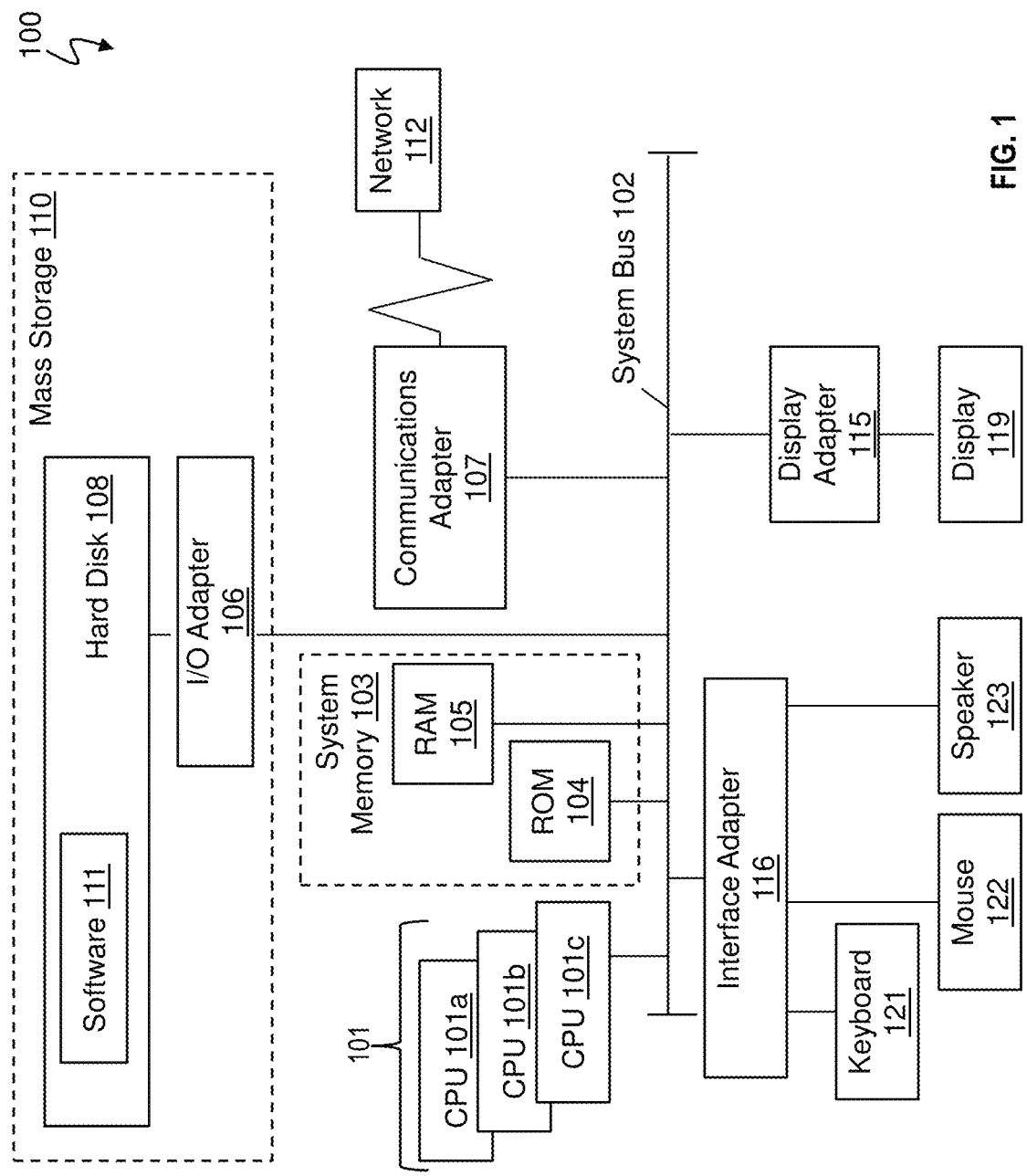
FIG. 1 depicts a block diagram of an example computer system for use in conjunction with one or more embodiments of the present invention.

System administrators can determine a computing system's performance by monitoring log messages written by applications running on the system's subcomponents. Log message analysis itself, however, can be complicated. System logs consist of highly technical information that can be difficult and time-consuming to interpret. For complex computing systems (e.g., mainframes) it can be hard to determine the sophisticated correlations and causality among various messages. Manual review of these logs by a system administrator can be very time consuming and error prone.

Complications can arise from various factors. For example, applications often generate multiple log messages for a single event. Another potential complication is found in a log's text data, which is typically unstructured. Additionally, for a multi-purpose system two or more applications can write log messages at the same time for a common event. As the system administrator views log messages independently, it can be difficult to ascertain the subtle relationships between different log messages. Very often, however, understanding the greater context or "type of relationship" between log events is necessary to determine the severity of an anomaly or error, to properly diagnose the cause of the anomaly or error, and to implement improvements to avoid or mitigate the error in the future.

Determining the relationship between log events requires the system administrator to have an in-depth domain knowledge of the system's information technology environment and its operation data. The system administrator also needs a detailed grasp of the characteristics of the current operating system as well as an understanding of any previous analysis of similar log messages. Consequently, log review is usually reserved for manual review by domain experts.

Commercial software and system products often provide detailed documentation for log messages. Modern log analytic methods, however, are based on a study of the log data itself (e.g., log statistics, frequency, timing, patterns, etc.) and fail to leverage this log documentation knowledge base.

One or more embodiments of the present invention address one or more of the above-described shortcomings by providing computer-implemented methods, computing systems, and computer program products configured to integrate documentation knowledge with log mining data for system diagnosis. Effectively integrating log analytics with documentation knowledge can help to identify additional context information currently missed using conventional processes. In other words, by applying log domain knowledge to log analytics, additional insights or inferences can be made that are otherwise unavailable. Advantageously, integrating log documentation knowledge and log analytics can accelerate the process of problem discovery and can improve system diagnosis.

In some embodiments, a knowledge fusion engine integrates outputs from two cooperating systems: a documentation knowledge mining component and a log pattern mining component. The documentation knowledge mining component is configured to use natural language processing (NLP) to extract relationships between two or more log messages. For example, the documentation knowledge mining component can parse log messages and can identify, using text analysis, that a first message A refers to a second message B in the context of a sequence (e.g., "A followed by B," "for more information, see message B," etc.). This knowledge can be used to build a message graph. In some embodiments of the invention, each node of the message graph represents a unique message ID and each edge between nodes denotes a discovered connection between the nodes (e.g., A→B, etc.).

The log pattern mining component can be configured to discover log flow patterns in both a temporal sense as well as a semantic sense. In some embodiments of the invention, the log pattern mining component is configured to build log message graphs at both the job level (e.g., message A, B, and C in a job workflow A→B→C) and the workflow level (e.g., messages generated in the same time window from different jobs).

The knowledge fusion engine can integrate the graph outputs from the documentation knowledge mining component and the log pattern mining component into a single comprehensive graph. In some embodiments of the invention, the knowledge fusion engine annotates an initial log graph (e.g., a graph built by one of the documentation knowledge mining component and the log pattern mining component) with additional nodes and edges discovered via the other component (e.g., if the based graph is built by the documentation knowledge mining component the supplemental nodes and edges can be discovered via the graph built by the log pattern mining component). In some embodiments of the invention, the knowledge fusion engine can further augment the integrated graph with information obtained via log analytics. Log analytics can include, for example, a frequency of a sequential relation (e.g., A→B→C count=3) and timing statistics (e.g., t(B)-t(A) averages 10 seconds, is always greater than 30 seconds, etc.). Log analytics can be used to prune or otherwise enhance a log graph. For example, cold edges (defined as an edge having a frequency below some threshold) can be removed.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
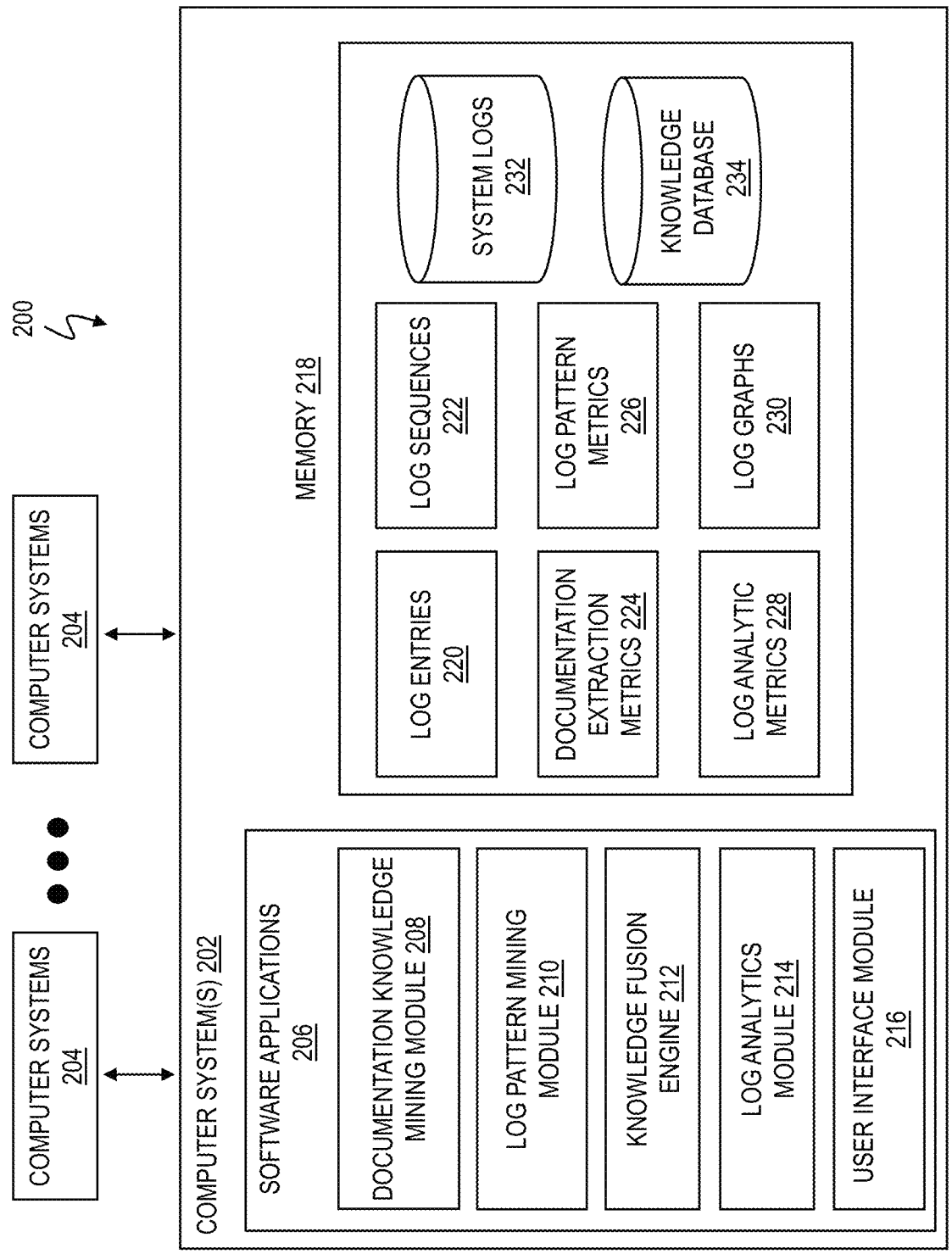
FIG. 2 is a block diagram of a system for message correlation extraction in accordance with one or more embodiments of the present invention.

FIG. 2 is a block diagram of a system 200 configured to integrate documentation knowledge with log mining data for system diagnosis in accordance with one or more embodiments of the present invention. FIG. 2 depicts one or more computer systems 202 coupled to one or more computer systems 204 via a wired and/or wireless network. For example, computer system 202 can be representative of numerous computers in a datacenter that services various users, and computer systems 204 can be representative of numerous computers in a datacenter. One or more of the computer systems 202 can be configured to collect metrics and logs associated with the operation of one or more of the computer systems 204, where the computer systems 204 can also be referred to as monitored computer systems 204. The monitored computer systems 204 may be observed to collect representative performance data and events during operation of the system 200. Elements of the computer system 100 of FIG. 1 may be used in and/or integrated into computer systems 202 and computer systems 204. One or more software applications 206 can include a documentation knowledge mining module 208, a log pattern mining module 210, a knowledge fusion engine 212, a log analytics module 214, and a user interface module 216. The software applications 206 may utilize and/or be implemented as software 111 executed on one or more processors 101, as discussed in FIG. 1.

Figure 3:
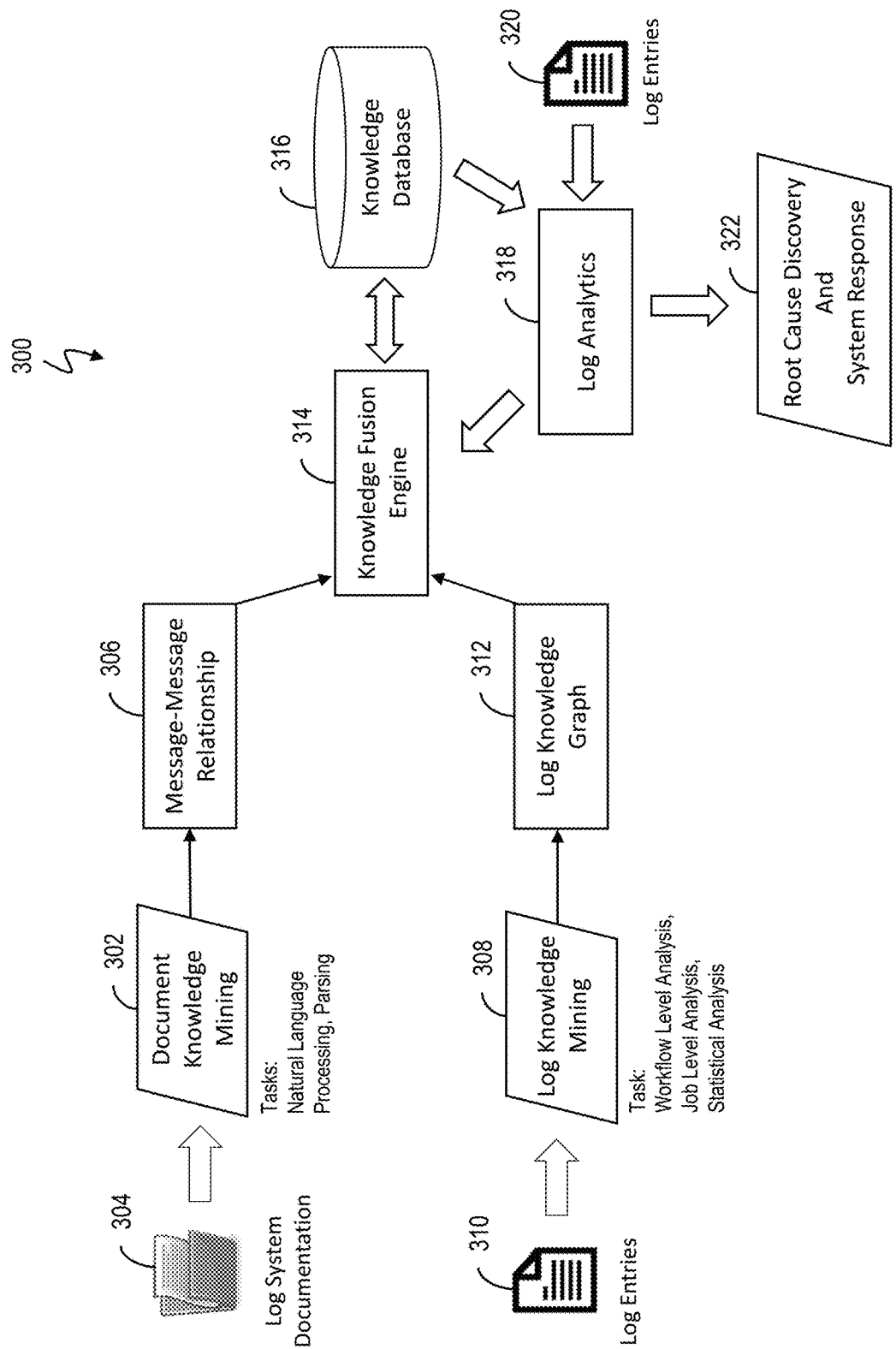
FIG. 3 is a block diagram of a dataflow for integrating documentation knowledge with log mining data in accordance with one or more embodiments of the present invention.

Memory 218 of the computer systems 202 can store, for example, a plurality of log entries 220 (e.g., message log entries), log sequences 222, documentation extraction metrics 224, log pattern metrics 226, log analytic metrics 228, and log graphs 230. A dataflow 300 of FIG. 3 illustrates interactions between various components of the software applications 206 and memory 218 of FIG. 2 for integrating documentation knowledge with log mining data.

In some embodiments of the invention, the documentation knowledge mining module 208 is configured to retrieve log system documentation data from a knowledge database 234. In some embodiments of the invention, log system documentation files are stored in a subsystem (e.g., mainframe subsystem) of the computer system(s) 202. The log system documentation data can include metadata about the system logs 232 themselves. In some embodiments of the invention, the log system documentation data can include message-message relationship data that specifically carries run-time information for log graphs in running systems. For example, the log system documentation data can include a list of messages B, C, D, etc. referred to in documentation for a first message A as well as documentation for how those messages are related (e.g., the documentation text for message A can refer to message B as an exception for message A, while messages C and D are execution results during run-time, etc.).

In real logs, messages are correlated most with their temporal relations (e.g., sequential, "message A followed by message B," "message A precedes message B," etc.) and semantic relations (e.g., "message A triggers message B on failure," "for more information see message B," etc.). These temporal and semantic relationships can represent real run-time correlations that can be mined or otherwise discovered by review of the log system documentation data by the documentation knowledge mining module 208.

In some embodiments of the invention, the documentation knowledge mining module 208 is configured for run-time (e.g., real-time during system operation) message correlation discovery using various text analytic techniques (e.g., parsing and tokenization). For example, the documentation knowledge mining module 208 can include a document parser that performs a process of tokenization (sometimes referred to as text segmentation or lexical analysis) of the log system documentation data to separate the text into a list of tokens. The individual tokens can include, for example, individual words, phrases, sections, and sentences. The message parser can further remove noisy data by performing a clean stopword technique to remove stopwords from the text string of a log message. Stopwords are words or phrases that provide little value to deriving the context of a log message. For example, commons stopwords that can be filtered out of the strings include "is", "an", and "the". The message parser can apply various techniques to determine whether a word or phrase is a stopword. For example, the message parser can access a library of stopwords from the knowledge database 234, compare the entries in the library to the words contained in the log message, and remove the stopwords as defined by the dictionary.

The documentation knowledge mining module 208 can also perform a stemming technique or a lemmatization technique on the tokens that remain after the stopwords have been removed. Stemming refers to the heuristic technique of removing the end (e.g., the suffix) of a word to reach a common base form. For example, the "participated", "participant", and "participating" can each be reduced to "partipat" by removing the end of the words. Lemmatization is a technique that applies the use of vocabulary and a morphological analysis of the words to determine the common base form. The documentation knowledge mining module 208 can further convert the remaining tokens into a word vector. A word vector is a numeric representation of the respective entity types of the remaining tokens and denotes their semantic meaning. Converting the log system documentation data into word vectors assists with the statistical analysis of the documentation data.

The specific text analytic techniques employed are not meant to be particularly limited. In some embodiments of the invention, the documentation knowledge mining module 208 is configured to semantically and/or statistically analyze text data to determine a message log context. The documentation knowledge mining module 208 can apply natural language processing (NLP) techniques to analyze the morphology, syntax, and logical semantics of the text of the documentation data. For example, the documentation knowledge mining module 208 can traverse the documentation text for a particular message or message type to determine a relational connection to one or more additional messages (e.g., message A is an exception thrown from message B, message A is an execution result of message B, etc.).

In some embodiments of the invention, the documentation knowledge mining module 208 can make message-message correlation determinations based on a functional relationship within the log documentation. For example, a message identification code of a first log message can be analyzed to detect that the log message relates to the initiation of a job task K. The documentation knowledge mining module 208 can retrieve a second message identification code of a second log message and detect that the second log message relates to either the completion of the job task or a conditional response to initiation of the job task. In this instance, semantic analysis reveals that the two log messages are functionally correlated.

The documentation knowledge mining module 208 can be configured to retrieve domain-specific data from the knowledge database 234. The documentation knowledge mining module 208 can be further configured to analyze log message documentation data to determine a temporal relation between two or more messages. For example, the documentation can include a first message (e.g., message A) having a message entry (e.g., message field data) "A is preceeded by B" or a message entry "A follows B". These entries can be input to the documentation knowledge mining module 208 and resolved as temporal output data "B→A" or "A→B", respectively, indicating that message A occurs after (or before) message B.

In some embodiments of the invention, the documentation knowledge mining module 208 is configured to receive log message field data and to perform one or more NLP techniques including keyword matching, sequential analysis, and sentence pattern analysis on the message field data to determine a temporal or semantic relationship between two or more messages.

Keyword matching includes a word-by-word comparison of each word or token in a message field against one or more predetermined keywords stored, e.g., in the knowledge database 234. Keywords can include, for example, "accompany," "after," "preceded by," and "following," although it is understood that any number of additional keywords are possible. In some embodiments of the invention, the keywords are linked or otherwise associated with predetermined message relationship contexts. For example, the keyword "after" can be paired with the concept A→B. In this manner, the keywords can leverage domain knowledge to quickly indicate message relationships.

Sequential analysis includes analyzing message data (e.g., message field data, message token data, etc.) to discover sequential order variations. For example, a first message A may include the string "A is preceded by B" while a second message C may include the string "A is followed by B." Note that message C need not be the same as message B. This type of analysis can be used to discover variations in the sequences of messages. Continuing from the prior example, the relationships A→B and B→A are possible. In some embodiments of the present invention, the sequential analysis can be stored in memory 218 as log sequences 222.

Sentence pattern analysis includes analyzing message data (e.g., message field data, message token data, etc.) to discover sentence patterns. For example, a first message A may include the string "Message B will be present in the system log when a coordinated AES master key change has occurred as noted in message C." This type of analysis can indicate complex relationships that are otherwise missed by keyword or sequence searches. Continuing from the prior example, the relationship "if C→B must exist" can be discovered. As another example, a first message A may include "If you are not doing an automatic rebind, message B might accompany this message and identify that resource." Sentence pattern analysis for this string could indicate that A→B is an optional relationship.

The documentation knowledge mining module 208 can be further configured to analyze two or more message fields to determine a semantic relation (e.g., a condition, execution, action taken, resource consumed, exception, etc.) between two or more messages.

Figure 6:
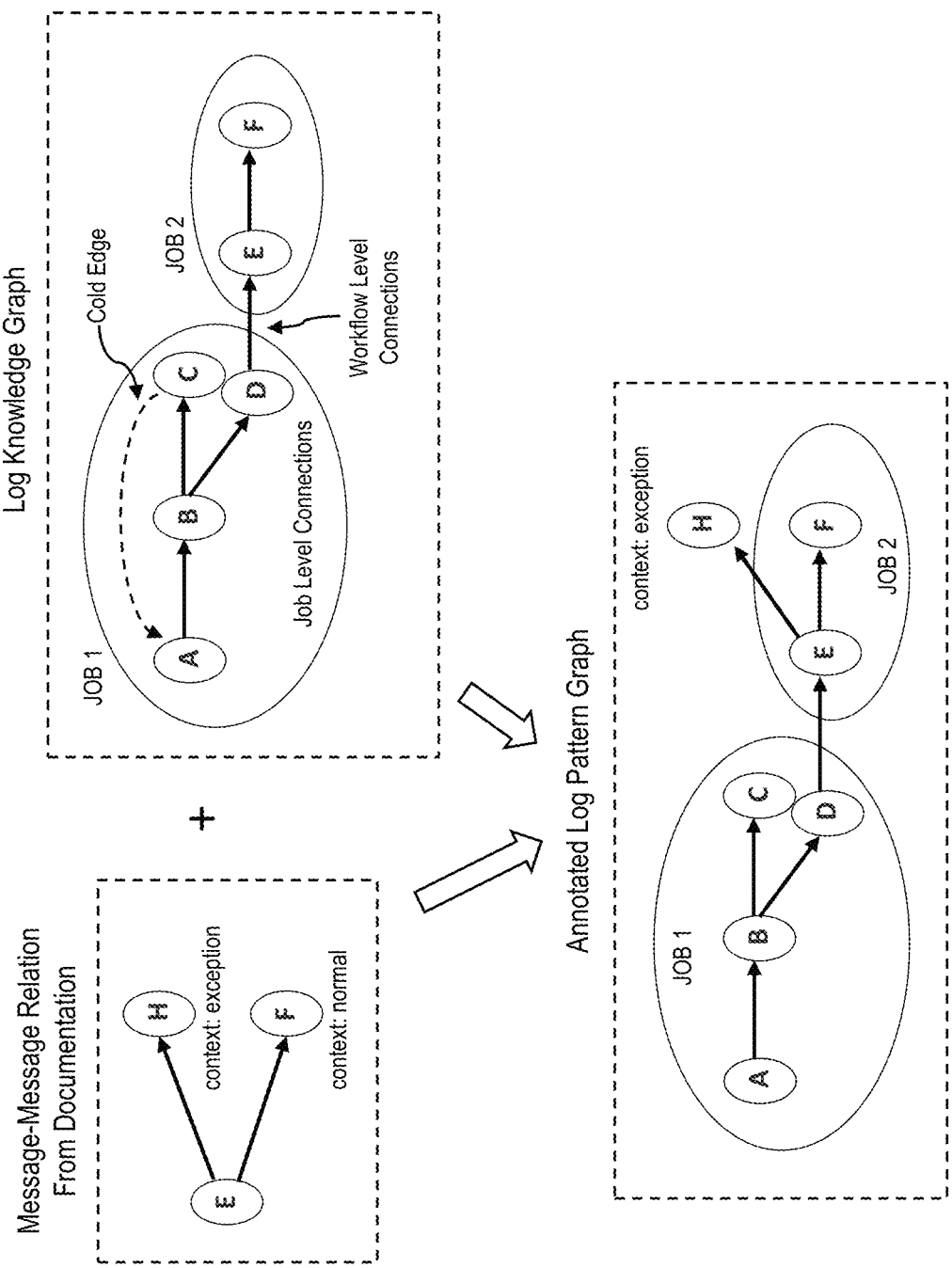
FIG. 6 illustrates an example of an annotated log pattern graph extracted in accordance with one or more embodiments of the present invention.

In some embodiments of the invention, knowledge mined by the documentation knowledge mining module 208 is stored as documentation extraction metrics 224. In some embodiments of the invention, the documentation extraction metrics 224 include metadata for one or more nodes and edges of a graph, where each node represents a unique message ID and each edge denotes a connection between messages. In other words, an edge defines the context of "how" the various messages are connected (e.g., B is an exception thrown from message A on condition X, etc.). FIG. 6 illustrates an example of a message-message relationship extracted using the documentation knowledge mining module 208. In particular, the sequence E→H denotes an exception while the sequence E→F denotes normal operation (see top left portion of FIG. 6).

In some embodiments of the invention, the log pattern mining module 210 is configured to retrieve one or more log messages from system logs 232. In contrast to the log system documentation data, which includes metadata for the logs, the log messages include the actual logs written by one or more applications running on the computer system(s) 202. In some embodiments of the present invention, the documentation knowledge mining module 208 can store the log messages from the system logs 232 as log entries 220.

Figure 4:
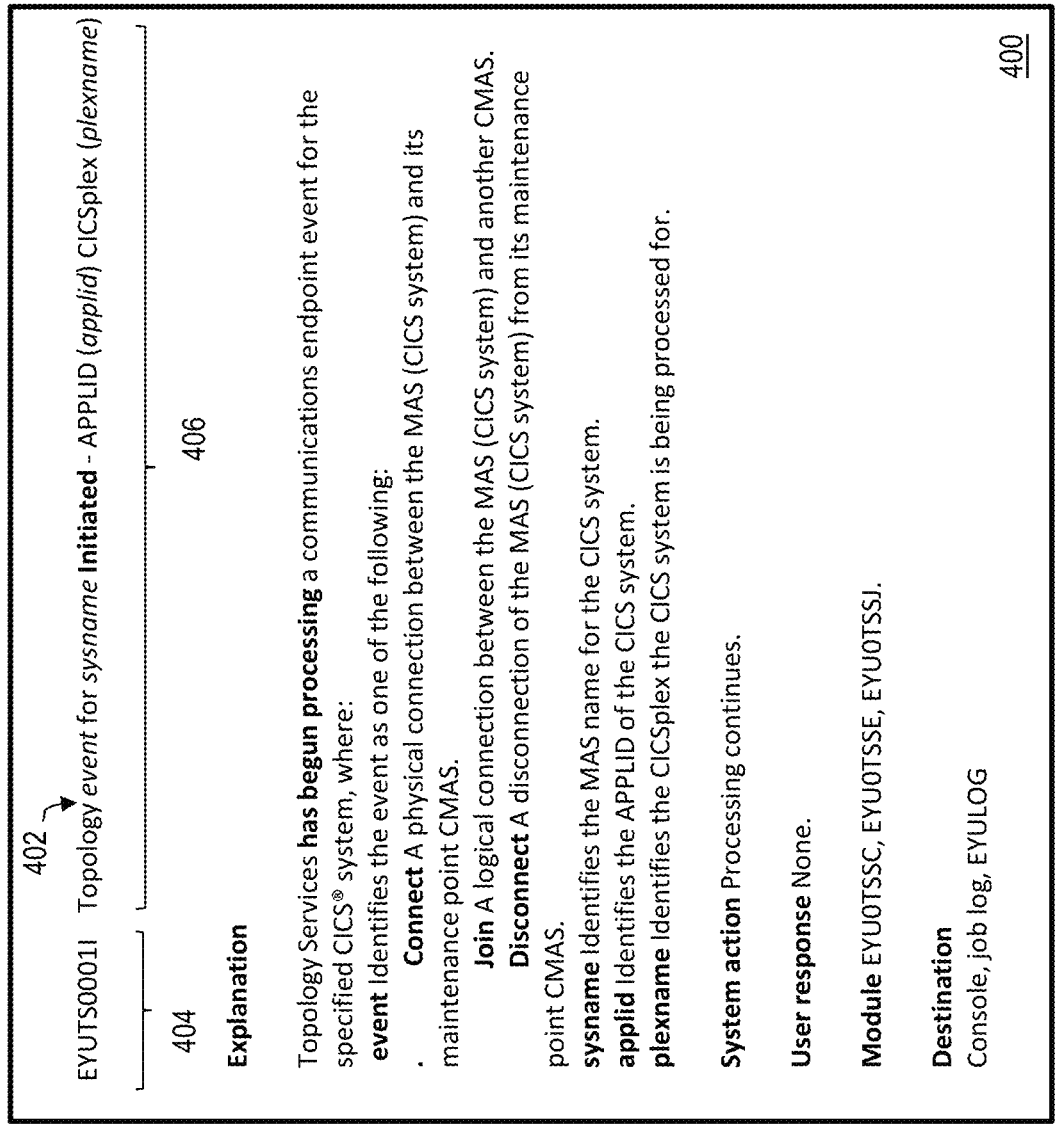
FIG. 4 illustrates a log message in accordance with one or more embodiments of the present invention.

FIG. 4 illustrates an example template for a log message 400 and a narrative explanation is shown. The log message 400 includes a message template 402, which includes a message ID 404 and a message text 406. FIG. 5 illustrates a log message 500 that is correlated with the log message shown in FIG. 4. Specifically, FIG. 4 illustrates the log message 400 for initiation of the topology event, and FIG. 5 illustrates the log message 500 for completion of the topology event (i.e., message 400→message 500 is a discoverable correlation according to one or more embodiments).

In some embodiments of the invention, each log message (e.g., the log messages 400 and 500) includes a message identifier that describes the type of message, the source of the message, and one or more fields describing the content or value of the message (e.g., "When this message is processing data sets named in preceding msgB, see msgC for an explanation and corrective action.") For example, the message identifier can be an alphanumeric string such as EYUTS0001I. After the pre-processing module 208 (e.g., message parser) has tokenized the log message, the message identification module 210 can detect the message identifier and identify the log message by comparing the message identifier to an operating system-specific table or dictionary of message identifiers. The operating system-specific table or dictionary can include a standard format of the log message and can be stored, for example, in the knowledge database 242. The message identification module 210 can further compare the format of the message to the standard format to verify the message's identity.

In some embodiments of the invention, the log pattern mining module 210 is configured for run-time (e.g., real-time during system operation) log pattern discovery using various text analytic techniques (e.g., parsing, tokenization, stemming, lemmatization, etc., as discussed with respect to the documentation knowledge mining module 208).

In some embodiments of the invention, the log pattern mining module 210 is configured to extract log templates from one or more log messages by removing the variable portions of those messages. For example, the message data "Message IEF677I: WARNING MESSAGE(S) FOR JOB FTPWF34D ISSUED" can be templated into the token "WARNING MESSAGE(S) FOR JOB **** ISSUED."

In some embodiments of the invention, these log templates are assigned a template ID (e.g., template 32, etc.). In some embodiments of the invention, the log messages received by the system are replaced with the corresponding templated ID. Continuing from the previous example, the log entry "Message IEF677I: WARNING MESSAGE(S) FOR JOB FTPWF34D ISSUED" can be replaced with "log templated ID 32" or simply "log 32"). Once the log messages have been templated, log flow patterns (in both temporal sense and semantic sense) can be more readily discovered.

In some embodiments of the invention, the log pattern mining module 210 is configured to build a log graph of connected messages at the job level. As used herein, "at the job level" simply means that log messages can be grouped by their common job identifiers. In some embodiments of the invention, the job names are stored in a job name field of the message. For example, Job N can be common to messages A, B, C, and D (here, A, B, C, and D can be message template IDs). In some embodiments of the invention, the sequential context for each message associated with a job is also stored in field data throughout the messages. For example, the data field for message A can state "message A precedes message B" while the data field for message B can state "message C follows message B on condition 1 while message D follows message B on condition 2." From these message fields it is possible to construct a job level graph. Continuing with the current example, the log pattern mining module 210 could leverage the message field data in messages A, B, C, and D to construct the job level graph for "JOB 1" illustrated in FIG. 6.

In some embodiments of the invention, the edge between connected nodes (messages or template IDs) includes contextual or statistical supplemental information. For example, the edge can include a frequency of the respective sequential relation (e.g., the A→B edge could include a "count=2" value when the A→B edge occurs twice in the job sequence. Additionally, or in the alternative, the edge can include timing data. For example, statistics for the time difference of message B after message A is received (e.g., $t(B)-t(A)$). These statistics could include the average time between the messages, the shortest or longest time recorded between the messages, etc.

In some embodiments of the invention, the log pattern mining module 210 is further configured to build a log graph of connected messages at the workflow level. As used herein, "at the workflow level" simply means that log messages can be grouped when those messages occurring in the same time window even when those messages refer to different jobs. For example, two messages D and E can be connected if they each occur during a time window having a defined duration, even if messages D and E refer to different jobs (e.g., message D is part of JOB 1 and message E is part of JOB 2 as illustrated in FIG. 6). In some embodiments of the invention, the window timing duration is preconfigured as a threshold (e.g., within 2 seconds, 100 microseconds, etc.). Continuing with the current example, the log pattern mining module 210 could leverage the message field data in messages E and E to connect the job level graphs for "JOB 1" and "JOB 2" illustrated in FIG. 6. In some embodiments of the invention, the output of the log pattern mining module 210 (either or both of the job level graph and the workflow level graph) can be stored as log pattern metrics 226.

In some embodiments of the invention, the log pattern mining module 210 is configured to prune or remove some mined or discovered edges (referred to herein as "cold edges") from either or both of the job level graph and the workflow level graph. Cold edges can be defined according to predetermined conditions, such as, for example, for all edges having a frequency "count" that is less than a threshold, or less then 5%, 20%, 50%, etc. of a "count" of another edge in the current graph. Cold edges are associated with false positives, or in other words, when two messages accidently occur together by chance alone (i.e., outside of a job or intentional workflow). To illustrate, consider the log knowledge graph illustrated at the top right portion of FIG. 6. Further consider a discovered edge C→A has been found having a count N. This edge (e.g., C→A) can be labeled a cold edge and discarded if the other edges in the job/workflow (here, A, B, C, and D in JOB 1) have a co-occurrence count M>>N. For example, if the C→A edge has a count of 3 and the other edges (e.g., A→B, B→D) have counts ranging from 15 to 30, the C→A edge can be discarded as a cold edge. While a specific example for cold edge discover has been provided for illustration, it is understood that the threshold (e.g., co-occurrence count or frequency threshold) for a cold edge can change depending on the context of a particular job or workflow. For some jobs or workflows, a difference of a single count can be enough to identify a cold edge, while in other jobs or workflows the difference can be arbitrarily greater.

In some embodiments of the invention, the log pattern mining module 210 is configured to extract collocation relations (co-occurrences) if two of them are mentioned in one message body or one is referred by the other in the same context As used herein, a "co-occurrence" means that a first message refers to a second message either directly or indirectly (e.g., via an intermediate message). For example, a first message (e.g., message A) can include a message entry (e.g., message field data) "Refer to the information in the accompanying message B to determine the cause of the I/O error" or a message entry "If you are not doing an automatic rebind, message B might accompany this message and identify that resource". These message entries can be input to the log pattern mining module 210 and resolved as the co-occurrence output pair "msgA-msgB" indicating that message A and message B co-occur. In other words, message A implies message B and vice versa (e.g., if A, look for B; if B, look for A).

In some embodiments of the invention, a knowledge fusion engine 212 is configured to integrate the output of the documentation knowledge mining module 208 (e.g., the temporal and semantic message-message relationship graphs) with the output of the log pattern mining module 210 (e.g., job and workflow level graphs). The integrated graph can be referred to as an annotated log pattern graph. In some embodiments of the present invention, the knowledge fusion engine 212 can store the annotated log pattern graph as log graphs 230. An example annotated log pattern graph is shown at the bottom portion of FIG. 6. As shown in FIG. 6, a message-message relationship mined from the log documentation (top left portion) is combined with a log knowledge graph (top right portion) to produce the annotated log pattern graph (bottom portion). Note that the cold edge in the log knowledge graph has been dropped while the additional E→H exception sequence has been added.

In some embodiments of the invention, a log analytics module 214 is configured to supplement the annotated log pattern graph generated by the knowledge fusion engine 212 with analytics-based data obtained from the log entries 306. The analytics can include statistical measures such as, for example, "message A caused by message B in 85% of co-occurrences" and "message B 15% more likely after sequence A→C," although other measures are within the contemplated scope of the system.

The user interface module 216 can be configured to provide an output to a user interface (e.g., interface adaptor 116 of FIG. 1) of a display (e.g., display adaptor 115 of FIG. 1). In some embodiments of the invention, the user interface module 216 is configured to generate and display an alert or other message describing one or more message correlations extracted according to one or more embodiments.

FIG. 3 is a block diagram of a dataflow for integrating documentation knowledge with log mining data in accordance with one or more embodiments of the present invention. As shown in FIG. 3, the dataflow can begin with document knowledge mining 302. Document knowledge mining 302 can receive as input log system documentation 304 and can generate, as output, a message-message relationship 306. Document knowledge mining 302 can generate the message-message relationship 306 in a similar manner as discussed with respect to the documentation knowledge mining module 208 of FIG. 2.

In addition, or alternatively, log knowledge mining 308 can receive as input log entries 310 and can generate, as output, a log knowledge graph 312. Log knowledge mining 308 can generate the log knowledge graph 312 in a similar manner as discussed with respect to the log pattern mining module 210 of FIG. 2.

The knowledge fusion engine 314 can combine or otherwise integrate the message-message relationship 306 and the log knowledge graph 312 as discussed previously with respect to the knowledge fusion engine 212 of FIG. 2. In some embodiments of the invention, the knowledge fusion engine 314 is communicatively coupled to a knowledge database 316 and/or log analytics 318. Log analytics 318 can receive log entries 320 and can supplement the knowledge fusion engine 212 in a similar manner as the log analytics module 214 discussed with respect to FIG. 2.

In some embodiments of the invention, log analytics 318 generates an output or alert (e.g., root cause discovery and system response 322). In some embodiments of the invention, the output or alert is pushed via the user interface module 216 (FIG. 2) to a display 119 (FIG. 1) for user review. In some embodiments of the invention, root cause discovery and system response 322 includes one or more system changes on a host (e.g., computer system(s) 202) or client (e.g., computer system(s) 204) device. System changes can include starting, stopping, or modifying a process. For example, root cause discovery and system response 322 can include a determination based on message log-based system diagnosis that an exception was thrown due to an unexpected change in an upstream system condition (e.g., a variable, a sensor input, etc.) and, in response, can reinitialize, stop, or modify the upstream component based on mined log knowledge to correct the underlying cause of the exception. In some embodiments of the invention, root cause discovery and system response 322 can issue a system interrupt to change the operating state of the system. For example, the root cause discovery and system response 322 can issue a system interrupt to bypass a module or other system component that has been found to be deficient.

Figure 7:
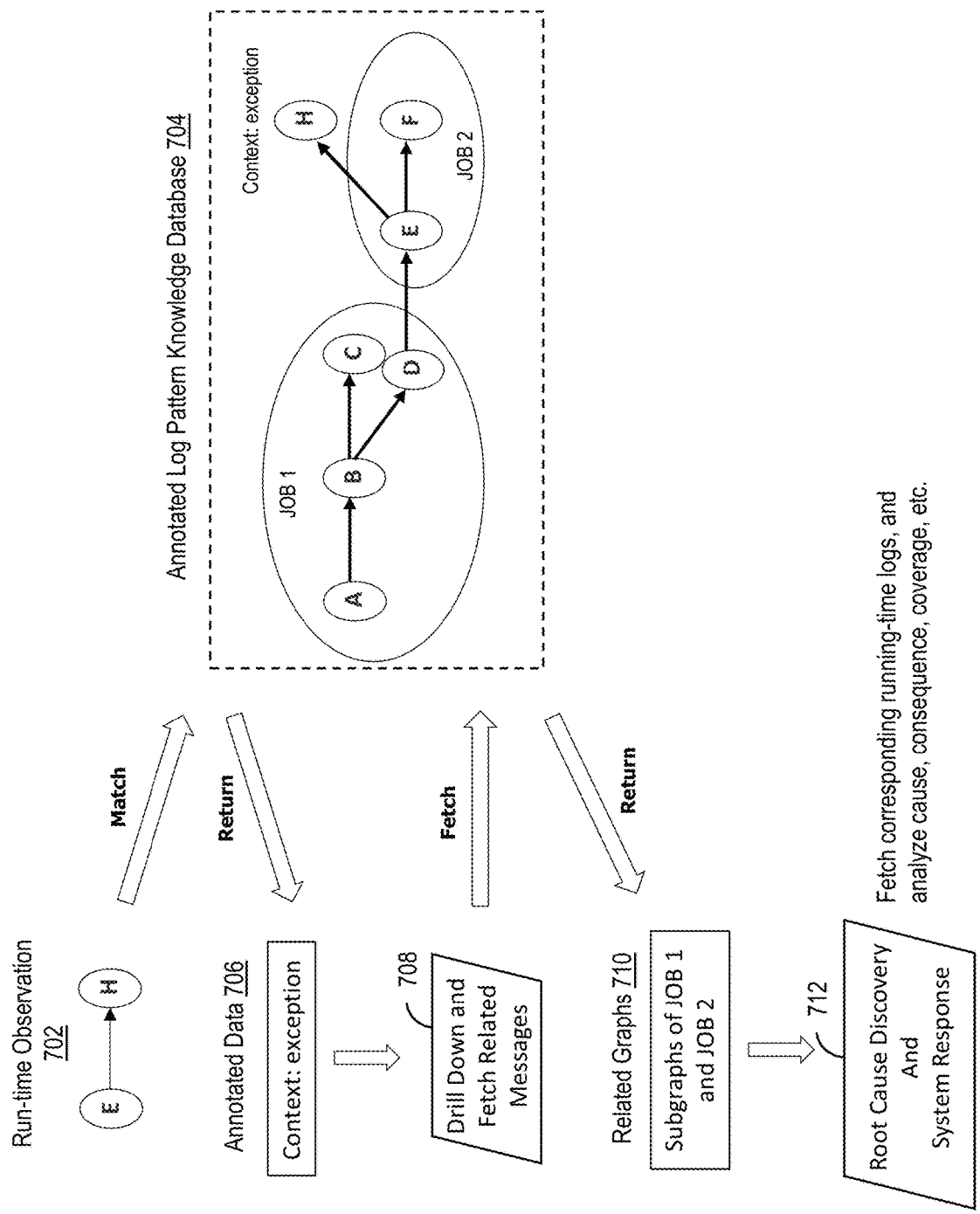
FIG. 7 is a block diagram of a dataflow for applying annotated log pattern graphs to log messages for problem diagnosis in accordance with one or more embodiments of the present invention.

FIG. 7 is a block diagram of a dataflow for applying annotated log pattern graphs to log messages for problem diagnosis. As shown in FIG. 7, the dataflow can begin with a run-time observation 7 (as shown, the log template sequence E→H, also referred to as the subgraph E→H). In some embodiments of the invention, the log template sequence is matched against an annotated log pattern knowledge database 704. The annotated log pattern knowledge database 704 can include a complete or partial database of known log pattern graphs. The known log pattern graphs can be previously mined and annotated according to one or more embodiments.

If a match is found, annotated data 706 from the matching annotated log pattern graph that includes the observed subgraph (e.g., E→H) is returned. As shown in FIG. 7 for the purposes of illustration only, the annotated data 706 for the observed subgraph E→H includes the annotation data "context: exception" denoting that the E→H sequence observed by the system signifies that an exception has occurred. While FIG. 7 is shown with a specific annotation, it is understood that other annotations are possible.

In some embodiments of the invention, the system can fetch 708 all the related graphs 710 (including, e.g., subgraphs, or individual nodes) within the annotated log pattern knowledge database 704 that are connected to the observed log message subgraph (e.g., E→H). In other words, the system can fetch the entire annotated low pattern graph (e.g., the JOB 1+JOB 2 graph shown in FIG. 7). In some embodiments of the invention, the fetching operation can be subject to parameters that specify the traverse depth. For example, a fetch depth=1 means fetch only the neighbor nodes that are directly connected with the observed subgraph. Continuing with the prior example, a fetch depth of 1 would return the sequence D→E→[H, F]. Increasing the fetch depth would return a correspondingly greater portion of the overall annotated log pattern graph. Continuing with the prior example, a fetch depth of 3 would return the entire annotated log pattern graph.

In some embodiments of the invention, the related graphs 710 can be leveraged for root cause discovery and system response 712 in a similar manner as discussed with respect to root cause discovery and system respond 322 in FIG. 3. In some embodiments of the invention, root cause discovery and system response 712 includes fetching corresponding running-time logs, and analyzing cause, consequence, coverage, etc. for the observed subgraph.

Figure 8:
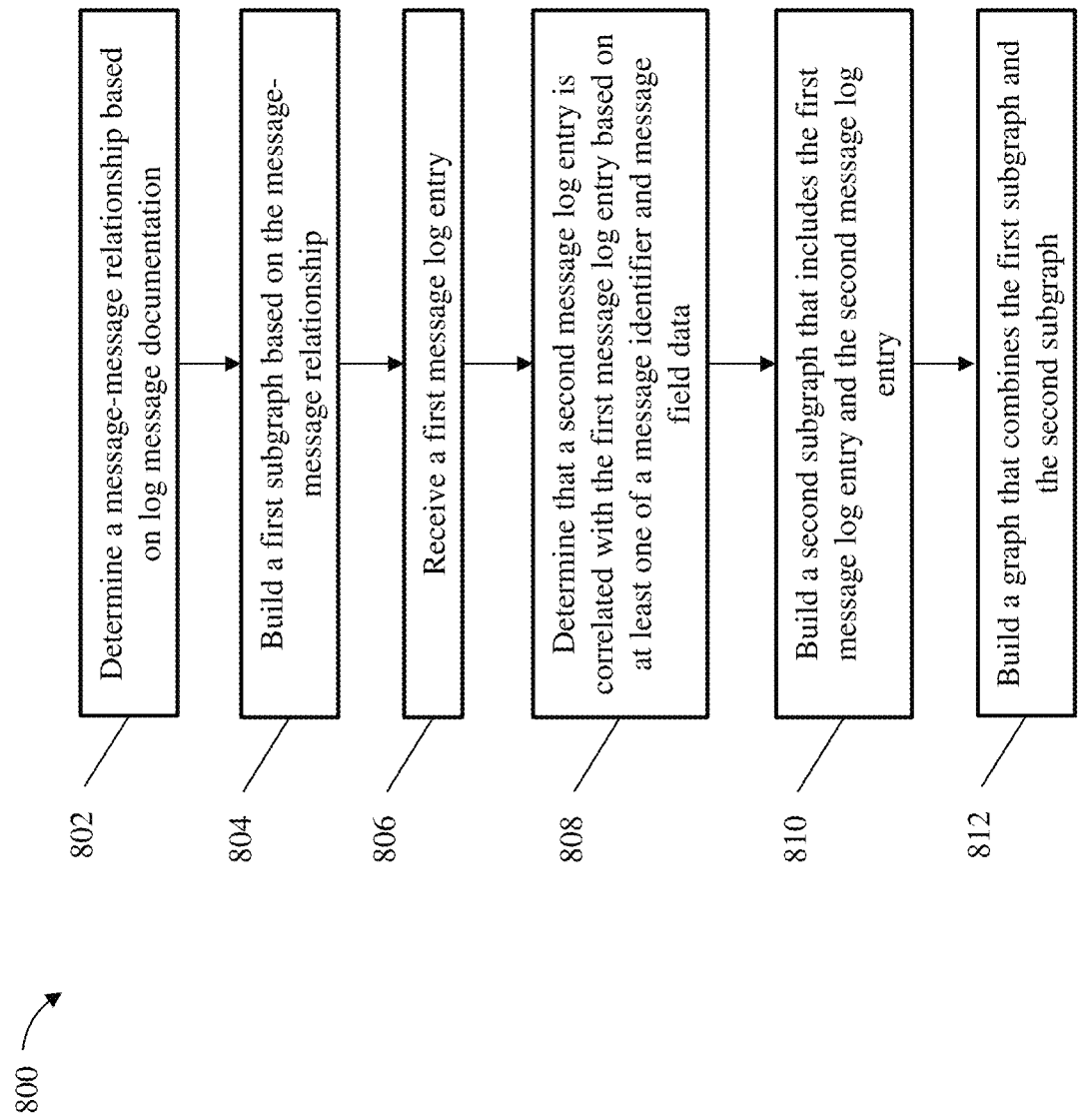
FIG. 8 is a flowchart for integrating documentation knowledge with log mining data in accordance with one or more embodiments of the present invention.

FIG. 8 is a flowchart 800 for integrating documentation knowledge with log mining data according to an embodiment. The flowchart 800 is described in reference to FIGS. 1-7 and may include additional steps not depicted in FIG. 8. Although depicted in a particular order, the blocks depicted in FIG. 8 can be rearranged, subdivided, and/or combined. At block 802, a message-message relationship is determined based on log message documentation. In some embodiments of the invention, the log message documentation is retrieved from a knowledge database. At block 804, a first subgraph is built based on the message-message relationship.

In some embodiments of the invention, determining the message-message relationship includes identifying a run-time correlation between two or more messages. In some embodiments of the invention, identifying the run-time correlation includes identifying a temporal relationship between the two or more messages. In some embodiments of the invention, identifying the run-time correlation includes identifying a semantic relationship between the two or more messages.

At block 806, a first message log entry is received. The first message log entry can include a message identifier and message field data. At block 808, a second message log entry is correlated with the first message log entry based on at least one of the message identifier and the message field data.

At block 810, a second subgraph is built. The second subgraph can include the first message log entry and the second message log entry. In some embodiments of the invention, building the second subgraph includes building a log message graph at the job level. In some embodiments of the invention, building the second subgraph includes building a log message graph at the workflow level.

At block 812, a graph is built that combines the first subgraph and the second subgraph. The graph can include an annotated log pattern graph constructed according to one or more embodiments.

Technical advantages and benefits of integrating documentation knowledge with log-based analytics (e.g., log mining data) according to one or more embodiments include automatically extracting message correlation data without the need for manual determinations by a domain expert. Automating message correlation extraction for problem diagnosis (e.g., debugging) can result in improved accuracy over human actors and can significantly reduce the time required to find correlations. One potential use case is found in system automation, where very often multiple jobs will be executed in sequence. Analysis of the logs using only conventional techniques is limited, and while the logs may capture data for each job, the relationship between the jobs themselves (e.g., these jobs are a sequence, job B is an exception outcome from job A, etc.) is not readily available.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
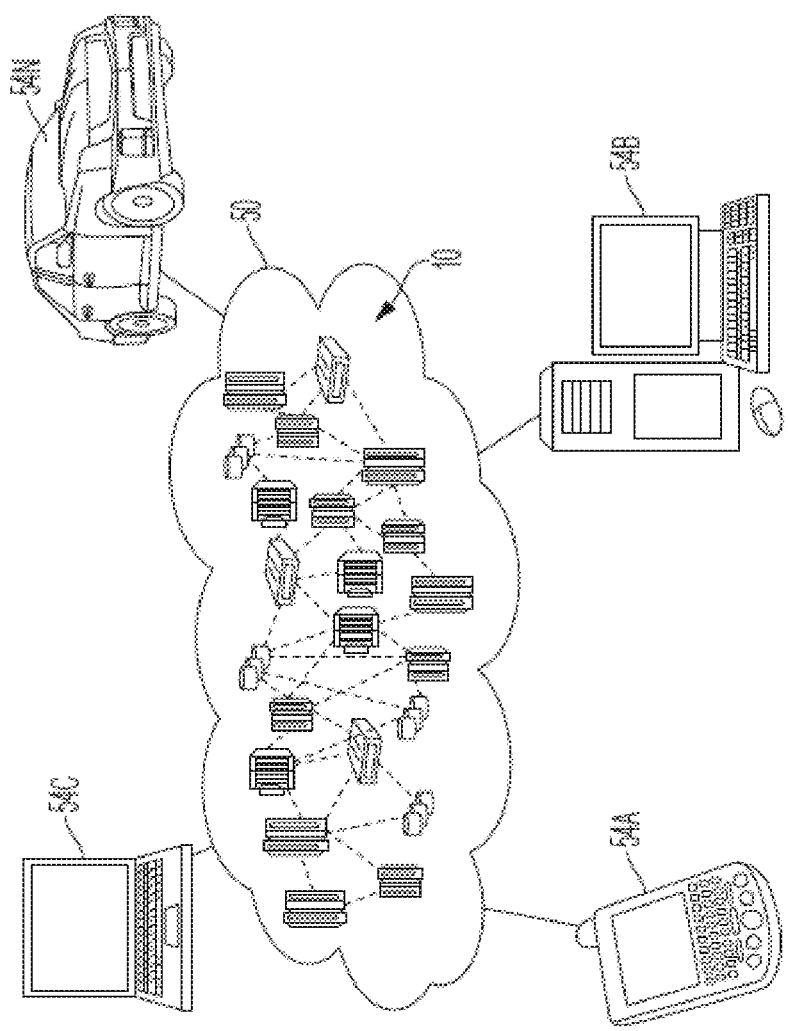
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
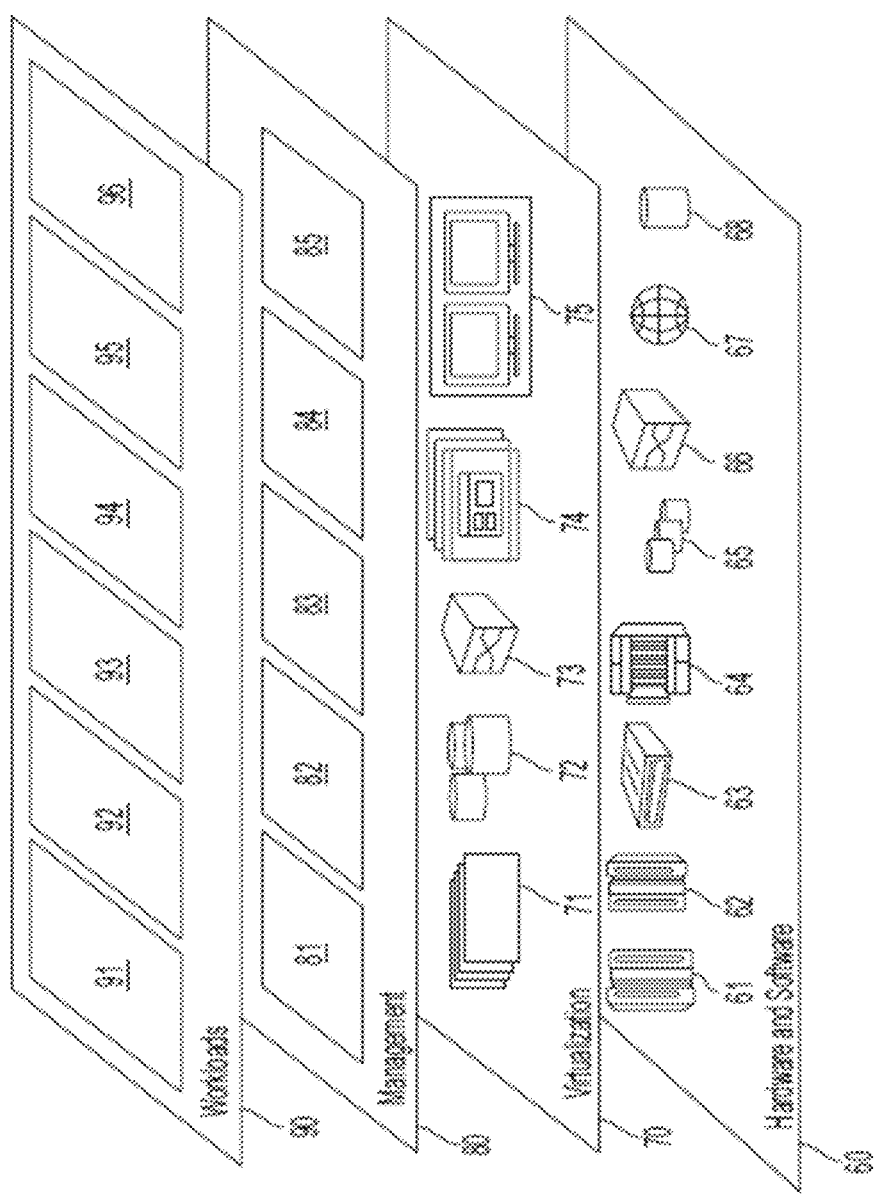
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining a message-message relationship based on log message documentation;
    building a first subgraph based on the message-message relationship;
    receiving a first message log entry comprising a message identifier and message field data;
    determining that a second message log entry is correlated with the first message log entry based on at least one of the message identifier and the message field data;
    building a second subgraph comprising the first message log entry and the second message log entry; and
    building a graph comprising the first subgraph and the second subgraph.

2. The computer-implemented method of claim 1, wherein the log message documentation is retrieved from a knowledge database.

3. The computer-implemented method of claim 1, wherein determining the message-message relationship comprises identifying a run-time correlation between two or more messages.

4. The computer-implemented method of claim 3, wherein identifying the run-time correlation comprises identifying a temporal relationship between the two or more messages.

5. The computer-implemented method of claim 3, wherein identifying the run-time correlation comprises identifying a semantic relationship between the two or more messages.

6. The computer-implemented method of claim 1, wherein building the second subgraph comprises building a log message graph at the job level.

7. The computer-implemented method of claim 1, wherein building the second subgraph comprises building a log message graph at the workflow level.

8. A system comprising:
    a memory having computer readable instructions; and
    one or more processors for executing the computer readable instructions, the computer readable instructions controlling the one or more processors to perform operations comprising:
        determining a message-message relationship based on log message documentation;
        building a first subgraph based on the message-message relationship;
        receiving a first message log entry comprising a message identifier and message field data;

determining that a second message log entry is correlated with the first message log entry based on at least one of the message identifier and the message field data;

building a second subgraph comprising the first message log entry and the second message log entry; and building a graph comprising the first subgraph and the second subgraph.

9. The system of claim 8, wherein the log message documentation is retrieved from a knowledge database.

10. The system of claim 8, wherein determining the message-message relationship comprises identifying a run-time correlation between two or more messages.

11. The system of claim 10, wherein identifying the run-time correlation comprises identifying a temporal relationship between the two or more messages.

12. The system of claim 10, wherein identifying the run-time correlation comprises identifying a semantic relationship between the two or more messages.

13. The system of claim 8, wherein building the second subgraph comprises building a log message graph at the job level.

14. The system of claim 8, wherein building the second subgraph comprises building a log message graph at the workflow level.

15. A computer program product comprising a computer readable storage medium having program instructions embodied therewith, the program instructions executable by a processor to cause the processor to perform operations comprising:

determining a message-message relationship based on log message documentation;

building a first subgraph based on the message-message relationship;

receiving a first message log entry comprising a message identifier and message field data;

determining that a second message log entry is correlated with the first message log entry based on at least one of the message identifier and the message field data;

building a second subgraph comprising the first message log entry and the second message log entry; and building a graph comprising the first subgraph and the second subgraph.

16. The computer program product of claim 15, wherein the log message documentation is retrieved from a knowledge database.

17. The computer program product of claim 15, wherein determining the message-message relationship comprises identifying a run-time correlation between two or more messages.

18. The computer program product of claim 17, wherein identifying the run-time correlation comprises identifying a temporal relationship between the two or more messages.

19. The computer program product of claim 17, wherein identifying the run-time correlation comprises identifying a semantic relationship between the two or more messages.

20. The computer program product of claim 15, wherein building the second subgraph comprises building a log message graph at the job level.

* * * * *